UNITED STATES PATENT OFFICE 2,539,518

STABILIZED CHOCOLATE MATERIAL AND METHOD OF MAKING THE SAME

Milo Glenn Mayberry, Pittsburgh, Pa., assignor to Fanny Farmer Candy Shops, Inc., Rochester, N. Y., a corporation of New York No Drawing. Application October 8, 1949, Serial No. 120,413

13 Claims. (Cl. 99—23)

This invention relates to stabilized chocolate materials, such as non-homogeneous mixtures of cocoa solids, sugar, butter fat and the like, adapted for coating candies and casting into layers, bars and other bodies, as well as to methods of preparing the same, one object of the invention being to provide an improved chocolate mixture of this variety which is more effectively stabilized against the separation of the ingredients into non-miscible phases and the concentration of fatty substances tending to produce the gray surface film known as "bloom."

Another object is to produce a chocolate mixture of the above character having its ingredients stabilized by the addition of a small quantity of a harmless dispersing agent adapted to effectively prevent or retard the deleterious surface concentration of fatty substances known as "bloom."

Another object is to afford a more simple, convenient, and effective method for preventing the separation of such chocolate mixtures into non-miscible phases and the resulting appearance of bloom.

To these and other ends the invention resides in certain improvements and combinations of substances and method steps, all as will be hereinafter more fully described, the novel features being pointed out in the claims at the end of the specification.

Chocolate mixtures for making candy coatings, or chocolate layers, or for casting into bars or other bodies commonly comprise a non-homogeneous mixture of cocoa solids, sugar and butter fat and are prepared by melting and continuous stirring to prevent the ingredients from separating into non-miscible phases. In spite of such stirring, however, the fat or cocoa butter tends to concentrate at the surface of the coating, layer, or body and produce an undesirable gray surface film known as "bloom," when exposed to temperatures varying between 60 and 90° F.

Attempts have heretofore been made to prevent the appearance of "bloom" by various expedients which, however, have not proved wholly satisfactory. In the course of efforts to find more satisfactory methods for solving this problem, I have discovered that beneficial effects are obtained by the use of surface-active agents having some attraction for both fat and hydroxy compounds such as sugar. Certain partial esters of oleic and stearic acids and polyhydroxy compounds have been found to be effective in varying degree. Polyethylene glycol 400 monostearate and polyoxyethylene sorbitan tristearate were found to definitely improve the aging characteristics of the coatings, but were not completely satisfactory. Certain mixtures of sorbitan tristearate (Span 65) and polyoxyethylene sorbitan tristearate (Tween 65) were found to be more effective and are in fact the principal additives in my stabilized, non-blooming chocolate mixtures.

Thus, I have found that chocolate containing 0.007 per cent of a "dispersing agent" consisting of 90 weight per cent of Span 65 and 10 per cent of Tween 65 will retard the separation into phases which results in "bloom." Other additives which are even more effective are typically a mixture containing 30 per cent Span 65 and 70 per cent Tween 65, and a mixture of 50 per cent Tween 65 and 50 per cent Span 80 (sorbitan monooleate).

Tween 65 was found to stabilize chocolate and to materially retard the separation into phases resulting in "bloom." Mixtures containing Tween 65 and Span 65 in all proportions were also found to improve the stability of chocolate, although all these mixtures were not equally effective. I have found that Tween 65 can not be used indiscriminately with other surface-active agents as an effective stabilizer for chocolate. Although a mixture containing equal parts by weight of Tween 65 and Span 80 was found to be very effective for such purpose, a mixture of Tween 65 and Tween 60 (polyoxyethylene sorbitan monostearate) having the same weight composition has no stabilizing effect.

My stabilizing chocolate composition may be prepared by adding the required amount of such dispersing agent to the molten chocolate held at 100–120° F. (preferably at 110° F.) and stirring slowly for about two hours to insure a uniform dispersion of the additives throughout the batch. The dispersing agent may also be milled into solid chocolate, but this procedure is generally less convenient to carry out in the average candy manufacturing plant.

A concentration of 0.007 per cent of such dispersing agent is sufficient for effective stabilization of chocolate, but this quantity may be varied. Concentrations as low as 0.003 per cent definitely improve the stability of chocolate but are less effective than the optimum concentration of 0.007 per cent. Higher concentrations of additive may be used if desired but are limited in part by the solubility of the additive (or one of its components) in chocolate. Span 65, for example, separates from the batch on cooling when the concentration of the material reaches 0.063 per cent by weight. Mixtures of Tween 65 and Span 80 have a softening effect upon the chocolate. As a result, the use of excessively high concentrations of this mixture may deleteriously lower the softening point of the chocolate.

After the chocolate has been melted and the dispersing agent added, the mixture must be "tempered" before it can be used for coating or casting candy or other bodies made from it. The tempering of chocolate is a process influencing the crystallization and corresponding grain size of the cocoa butter contained therein. Thus, the chocolate mixture must be properly tempered to yield an attractive coating having the desired gloss. My dispersing agents prevent the separation of the fat from the solids and the resulting gray film formed by high concentration of fat on the surface, during and after such tempering heat treatment. Such tempering is a process familiar to the art of candy making and is not affected by any invention except as described above.

Applications of non-ionic surface-active agents of the type herein described have been generally regarded as restricted to systems in which the major component is water. Their utility in such systems has appeared to result from the ability of water (a highly polar substance) to form polar bonds, thus permitting the water molecules to associate around the additive to a high degree.

The results I have obtained on adding certain of these products to a non-aqueous system consisting of a mixture of sugar, cocoa solids and cocoa butter were thus of a surprising nature. Although sugar is a polyhydroxy compound, it is utterly different from water in its physical and chemical properties. Since it is not highly polar, molecularly speaking, it would not be expected to form such an association bond with the dispersing agent. Thus the observed resistance of chocolate to "bloom," resulting from the addition of my dispersing agents, is in no way similar to the stabilization of a water-in-oil emulsion. The precise mechanism whereby "bloom" is prevented by the presence of my additives in appropriate concentration is not now known. Suffice it to say that when employed in the manner herein described, they serve to yield a stabilized chocolate mixture, equally adaptable for coating candies, forming layers, and casting into bars and other bodies, which does not "bloom." My invention thus contributes a simple, practical, and useful improvement in the art of making and preserving such chocolate mixtures for the purposes described.

It will thus be seen that the invention accomplishes its objects and while it has been herein disclosed by reference to the details of preferred substances and method steps, it is to be understood that such disclosure is intended in an illustrative, rather than a limiting sense, as it is contemplated that various modifications in the ingredients and proportions and method steps will readily occur to those skilled in the art, within the spirit of the invention and the scope of the appended claims.

I claim:

1. The method of stabilizing chocolate mixtures for making coatings and casting into bodies, to retard the formation of surface bloom, comprising the step of adding to said mixtures a surface-active dispersing agent comprising polyoxyethylene sorbitan tristearate.

2. The method of stabilizing chocolate mixtures for making coatings and casting into bodies, to retard the formation of surface bloom, comprising the step of adding to said mixtures a surface-active dispersing agent comprising polyoxyethylene sorbitan tristearate and an ingredient selected from the group consisting of sorbitan tristearate and sorbitan monooleate.

3. The method of stabilizing chocolate mixtures for making coatings and casting into bodies, to retard the formation of surface bloom, comprising the step of adding to said mixtures a surface-active dispersing agent comprising polyoxyethylene sorbitan tristearate and sorbitan tristearate.

4. The method of stabilizing chocolate mixtures for making coatings and casting into bodies, to retard the formation of surface bloom, comprising the step of adding to said mixtures a surface-active dispersing agent comprising polyoxyethylene sorbitan tristearate and sorbitan monooleate.

5. The method of stabilizing chocolate mixtures for making coatings and casting into bodies, to retard the formation of surface bloom, comprising the step of adding to said mixtures a surface-active dispersing agent comprising polyoxyethylene sorbitan tristearate in the proportion of at least 0.003% of said mixtures.

6. The method of stabilizing chocolate mixtures for making coatings and casting into bodies, to retard the formation of surface bloom, comprising the step of adding to said mixtures a surface-active dispersing agent comprising polyoxyethylene sorbitan tristearate in the proportion of between about 0.003% and about 0.007% of said mixtures.

7. The method of stabilizing chocolate mixtures for making coatings and casting into bodies, to retard the formation of surface bloom, comprising the step of adding to said mixtures a surface-active dispersing agent comprising polyoxethylene sorbitan tristearate in the proportion of about 0.007% of said mixtures.

8. The method of stabilizing chocolate mixtures for making coatings and casting into bodies, to retard the formation of surface bloom, comprising the step of adding to said mixtures a surface-active dispersing agent comprising a mixture of from about 10% to about 70% by weight of polyoxyethylene sorbitan tristearate and from about 90% to about 30% of sorbitan tristearate.

9. The method of stabilizing chocolate mixtures for making coatings and casting into bodies, to retard the formation of surface bloom, comprising the step of adding to said mixtures a surface-active dispersing agent comprising a mixture of substantially equal proportions of polyoxyethylene sorbitan tristearate and sorbitan monooleate.

10. The method of stabilizing chocolate mixtures for making coatings and casting into bodies, to retard the formation of surface bloom comprising the step of adding to the molten chocolate mixture a surface-active dispersing agent comprising polyoxyethylene sorbitan tristearate and an ingredient selected from the group consisting of sorbitan tristearate and sorbitan monooleate, said dispersing agent being added in a proportion of at least about 0.003% of said mixtures.

11. A chocolate mixture for coatings and casting into bodies having as an ingredient thereof a surface-active dispersing agent comprising polyoxyethylene sorbitan tristearate, for retarding the formation of surface bloom.

12. A chocolate mixture for coatings and casting into bodies, having as an ingredient thereof a surface-active dispersing agent comprising a mixture of polyoxyethylene sorbitan tristearate and a substance selected from the group consisting of sorbitan tristearate and sorbitan monooleate, for retarding the formation of chocolate bloom.

13. A chocolate mixture for coatings and casting into bodies, having as an ingredient thereof a surface-active dispersing agent comprising a mixture of polyoxyethylene sorbitan tristearate and a substance selected from the group consisting of sorbitan tristearate and sorbitan monooleate, said dispersing agent being present in a proportion of at least about 0.003% by weight of said mixtures, for retarding the formation of surface bloom.

MILO GLENN MAYBERRY.

REFERENCES CITED

The following references are of record in the file of this patent:

UNITED STATES PATENTS

| Number | Name | Date |
| --- | --- | --- |
| 1,894,677 | Esmond | Jan. 17, 1933 |
| 2,422,486 | Johnson | June 17, 1947 |

OTHER REFERENCES

Atlas Surface Active Agents, Atlas Powder Co., Wilmington, Del., June, 1949, table No. 1 opposite page 26, pp. 15 and 20.